United States Patent [19]

Van Beek

[11] Patent Number: 5,138,027
[45] Date of Patent: Aug. 11, 1992

[54] POLYAMIDE OF DIMER ACIDS, ALKYLENE DIAMINE AND POLYALKYLENE POLYAMINE

[75] Inventor: Donald A. Van Beek, Elmhurst, Ill.

[73] Assignee: Henkel Corporation, Ambler, Pa.

[21] Appl. No.: 668,537

[22] Filed: Mar. 13, 1991

[51] Int. Cl.$^5$ .............................................. C08G 69/00
[52] U.S. Cl. ................... 528/339.3; 528/336; 528/338; 528/339; 528/340
[58] Field of Search ............... 528/339.3, 336, 338, 528/339, 340

[56] References Cited

U.S. PATENT DOCUMENTS 3,253,940  5/1966  Floyd et al. ..................... 106/316

*Primary Examiner*—Harold D. Anderson
*Attorney, Agent, or Firm*—Ernest G. Szoke; Wayne C. Jaeschke; Patrick J. Span

[57] ABSTRACT

A polyamide resin adapted for use in thermographic inks prepared from certain dimer acids and monomeric acids and a mixture of a diamine and a polyamine. The alkylene diamines and triamines, such as ethylene diamine and diethylene triamine, are preferred. With oleic acid dimer the monomeric acids are preferably stearic or isostearic acids and mixtures thereof. With the dimer of polyunsaturated acids the monomeric acid may also be the monomer residue from dimerized oleic acid.

20 Claims, No Drawings

POLYAMIDE OF DIMER ACIDS, ALKYLENE DIAMINE AND POLYALKYLENE POLYAMINE

BACKGROUND OF THE INVENTION

1. Field of the Invention

This invention relates to polyamide resins from dimer acids and their use in thermographic inks. The polyamide resins are prepared from an acid component comprising certain dimer acids and monomeric fatty acids, and an amine component comprising a mixture of a diamine, such as ethylene diamine and a polyalkylene polyamine, such as diethylene triamine.

2. Description of Related Art

Polyamide resins derived from polymeric fat acids have been known for a long period of time and have been developed commercially. Specific resins have been developed and adapted for a variety of uses including hot melt adhesives, coatings, films and inks particularly flexographic inks. Such resins have been prepared employing, in addition to the polymeric fat acids, a variety of copolymerizing dicarboxylic acids, monomeric monocarboxylic acids and a variety of amines. Flexographic inks employing polyamide resins prepared from dimer acids, mixtures of diethylene triamine and ethylene diamine, and lower aliphatic monocarboxylic acids such as acetic acid, are described in U.S. Pat. No. 3,253,940. CAS Registry Number 68475-87-6 describes polymers of dimerized $C_{18}$ unsaturated fatty acids with azelaic acid, isostearic acid, diethylene triamine and ethylene diamine.

A resin from tall oil acid dimer, hexamethylene diamine, azelaic acid and ethylene diamine was developed for use in thermographic inks. While having many desirable properties for such use, including an initially glossy smooth surface, such product over time develops a dull haze, referred to in the art as a bloom or blush, which significantly detracts from the commercial use of the resin as a thermographic ink. In the thermographic process a raised print is produced by putting down a layer of ink on paper, coating the ink with a thermographic powder and fusing the powder with heat to give a smooth, glossy surface. Because of bloom, the typical tall oil fatty acid based dimer resins, have found limited use in thermographic ink processes for small printing area applications, such as business cards and stationery, and found little application in large printing areas, such as packaging and greeting cards.

DESCRIPTION OF THE INVENTION

It has now been discovered that polyamide resins prepared from an acid component comprised of certain fatty acid based dimers and monomeric acids and an amine component, which includes a polyamine component as partial replacement for a diamine, provides a polyamide resin which will not bloom or blush over long periods of time. Print made from the resins of the present invention develop essentially no bloom under test conditions, while maintaining all of the other characteristics desired for the thermographic process, thereby opening up several potential areas of application for the thermographic process, such as large area printing on greeting cards and packaging boxes.

The polyamides of the present invention are prepared by reacting principally an acid component comprised of a dimer and a monomeric fatty acid and an amine component comprised of an alkylene diamine and an alkylene polyamine, employing substantially equivalent amounts of acid and amine. Optionally, a dicarboxylic acid may be employed to provide or adjust the softening point of the resin to one required for the thermographic printing process, i.e., 115°–125°, as the presence or absence of such dicarboxylic acid, in amounts to provide such softening point range, does not appear to have any significant effect on bloom.

The polyamide resins of the present invention will preferably be prepared from the ingredients, and amounts thereof, set out below:

| Component | General Range (eg) | Preferred (eg) |
|---|---|---|
| A. Amine Component: | | |
| Alkylene Diamine | 70–98 | 75–80 |
| Alkylene Polyamine | 2–30 | 20–25 |
| B. Acid Component: | | |
| (1) (a) Dimer from dimerization of mono-unsaturated fatty acid (Oleic acid dimer) | 73–80 | 74–78 |
| (b) Monomeric fatty acid | 20–27 | 22–26 |
| (c) Dicarboxylic Acid | <5.5 | 0–5.2 |
| (2) (a) Dimer from dimerication of poly-unsaturated fatty acid (tall oil acid dimer) | 65–75 | 68–72 |
| (b) Monomeric acid | 8–35 | 26–32 |
| (c) Dicarboxylic acid | <5.5 | 0–5.2 |

Dimer acid, and preparation thereof, has been known for some time. A process for dimerizing monounsaturated fatty acids such as oleic acid has been described in U.S. Pat. No. 2,793,219 issued May 21, 1957 assigned to Emery Industries, Inc., the disclosure of which is hereby incorporated by reference. In general, this process involves the dimerization of oleic acid at temperatures in the range of about 180° to 300° C., preferably about 200° to 260° C., in the presence of about 1 to 20% of a clay for a period sufficient to dimerize the oleic acid. The reaction is generally conducted under pressure to maintain the presence of about 1 to 5% water in the system, preferably at temperatures of about 230°–240° C., with 2–4% clay for about 2–4 hours.

The resulting dimer acid will have a dimeric content of greater than 70% with residual amounts of monomer and trimer, and can be distilled to provide products of higher dimer content, up to about 97% dimer content. The products may be also hydrogenated to provide lower iodine values and to improve color of the product. Commercially available dimerized oleic acid, oleic acid dimer, will contain from about 75% dimer content with monomer content of about 10–15%. Distilled products available will contain up to about 95% dimer content and 3–4% monomer content. In the present invention, it is understood that the term "oleic acid dimer" is intended to include the residual monomer in an amount of about 10–15%, either as residual monomer from the dimerization process for the lower dimer contents of 75–85% dimer or added residual monomer from a prior dimerization to a distilled higher dimer content product. The residual monomer, which can be distilled and recovered, is comprised of low molecular weight oligomers and in the hydrogenated product will contain significant amounts of isostearic acid, along with various monobasic esters, some having carbon atom lengths greater than 20. Thus, "oleic acid dimer", as used herein will include about 10–15% of dimerized oleic acid monomer. This monomer may also be represented by the formula $M_oCOOH$ where $M_oC$ represents the radical of the residual monomer from the dimerization of oleic acid. Thus, the oleic acid dimer is comprised of $HOOC\text{-}D_o\text{-}COOH$ and $M_oCOOH$.

In U.S. Pat. No. 2,731,481 there is described a non-clay process of dimerizing oleic acid in which a peroxide catalyst, such as di-tert-butyl peroxide, is employed. The clay catalyzed process is preferred however and has developed commercially. The oleic acid dimer may be represented by the idealized formula $HOOC\text{-}D_o\text{-}COOH$, where $D_o$ is the divalent, aliphatic, hydrocarbon residue of the dimerized oleic acid, having 34 carbon atoms.

A process for dimerizing polyunsaturated acids, such as linoleic and linolenic, a mixture of which with oleic acid is found in tall oil acids, has been described in U.S. Pat. No. 2,793,220, also issued May 21, 1957, assigned to Emery Industries, Inc. In general, the process is the same for the dimerization of oleic acid discussed above, involving dimerization at 180°–300° C., preferably about 200°–260° C. in the presence of 1–20% of a clay for a period sufficient to dimerize the unsaturated acids, generally conducted under pressure to maintain the presence of about 1–5% water in the system. As with dimerized oleic acid, the product may be hydrogenated and/or distilled, with commercially available products having dimer contents of about 97% and monomer contents of about 1%. The dimer resulting from the dimerization of the polyunsaturated acid may be represented by the $HOOC\text{-}D_p\text{-}COOH$.

The monomeric fatty acid employed in the acid component comprised of oleic acid dimer is preferably stearic acid, a saturated 18 carbon atom monocarboxylic acid or isostearic acid. Other monomeric fatty acids having from about 16–20 carbon atoms, preferably saturated, may be employed. Triple pressed stearic acid is commercially available and is preferred for purposes of this invention. Isostearic acid is also available derived from sources such as oleic acid or tall oil/canola fatty acids. The monomeric acid may be represented by the formula $R_1COOH$ where $R_1$ is the monovalent, aliphatic, hydrocarbon group having from 15 to 19 carbon atoms.

The monomeric fatty acid employed in the acid component comprised of the polyunsaturated acid dimer is preferably a mixture of stearic acid with either isostearic acid or the monomer from the dimerization of oleic acid obtained by distillation of the hydrogenated oleic acid dimer to remove and recover the monomer, which monomer contains significant amounts of isostearic acid along with other low molecular weight oligomers as discussed earlier above. Mixtures of such monomer and isostearic acid are particularly effective when employed with a tall oil fatty acid dimer having a dimer content of about 97%.

As indicated, a dicarboxylic acid may optionally be used in either acid component, generally for purposes of adjusting the softening point of the final product to one suitable for use as a thermographic powder, i.e. about 115°–125° C., preferably about 117° to 122° C. The preferred dicarboxylic acid is azelaic acid, a 9 carbon atom acid. Other dicarboxylic acids having from 6–10 carbon atoms may be employed however. The dicarboxylic acid will be employed in an amount to provide the desired softening point, and will generally be employed in an amount of less than about 5.5 equivalent percent, i.e. 4 equivalent percent or less. The exact amount will vary dependent on the particular dicarboxylic acid employed and its effect on softening point of the final product. The amount thereof may also need adjustment based on the amount of alkylene polyamine employed. With small amounts of polyamine employed, no dicarboxylic acid may be necessary; with larger amounts of polyamine, amounts up to about 5.2 equivalent percent of an acid, such as azelaic acid, may be necessary to maintain to the desired softening point. The dicarboxylic acids may be represented by the formula $HOOC\text{-}R_2\text{-}COOH$ where $R_2$ is a divalent, aliphatic, hydrocarbon radical having from 4 to 8 carbon atoms.

The amine component as earlier noted is a mixture of alkylene diamine and alkylene polyamine, and is employed in an amount essentially equal to carboxyl or acid equivalent of the acid component employed. The resulting product is accordingly a substantially neutral product, having amine and acid number or value, essentially equal, generally less than 15 and preferably less than 10.

The preferred alkylene diamine is ethylene diamine. However, other alkylene diamines in which the alkylene group contains up to 4 carbon atoms may be employed, such as propylene and butylene diamine. The shorter chain alkylene groups such as ethylene or propylene are preferred however. The diamine may be represented by the formula $H_2NRNH_2$ where R is an alkylene radical, a divalent, aliphatic, hydrocarbon group having from 2 to 4 carbon atoms.

The preferred alkylene polyamine is diethylene triamine. However, again other alkylene groups containing up to 4 carbon atoms may be employed although the shorter chain alkylene groups such as ethylene and propylene are preferred. While the triamine is preferred, the tetramine and pentamine may be employed, provided the final softening point is maintained. These may be presented by the formula $$H_2N(R^1NH)_nR^1NH_2$$

where $R^1$ is an alkylene radical, a divalent, aliphatic, hydrocarbon group having 2–4 carbon atoms and n is a whole integer from 1 to 3. Preferably $R^1$ is the ethylene or propylene divalent radical and n is 1.

The time and temperature of the reaction for preparation of the polyamide resin may be varied over a considerable range but is usually from 100° to 300° C., preferably 150°–300° C., for a period of from ½ to about 8 hours, the longer time period being used at the lower temperature. The time and temperature should be sufficient for the condensation reaction to effect amidification of the acid and amine components to provide the polyamide reaction product. As discussed earlier, the polyamide resin product for use as a thermographic powder will have a softening point of about 115°–125° C., preferably between 117° to 122° C.

The polyamide resin of the present invention can generally be described as the reaction product, condensation or amidification product, of X carboxyl equivalent percent of an acid component and Y amine equivalent percent of an amine component wherein the ratio of X and Y is about 1, wherein said acid component is selected from the group B(1) and B(2) described earlier and wherein the amine component is a mixture of an alkylene diamine and an alkylene polyamine, in which the alkylene group has from 2 to about 4 carbon atoms, preferably 2–3, such as the divalent ethylene group. In more detail the components will comprise or consist essentially of the composition noted earlier.

The invention can be further illustrated by the following non-limiting examples in which all parts and percentages are by weight unless otherwise noted. In the examples there are shown polyamides of the present invention generally denoted by arabic numerals and comparative examples generally denoted by a letter. Further, in the examples, the following terms, abbreviations and symbols have the following meanings:

VD 288: dimerized tall oil fatty acids having a dimeric content of ~97%, a monomeric content of ~1% and a trimeric content of ~2%; an acid value of 193-201, saponification value of 198 and an iodine value of 110-130, (source: Henkel Corporation Emery Group).

VD 58: dimerized tall oil fatty acids having a dimeric content of ~97%, a monomeric content of ~1% and a trimeric content of ~3%, an acid value of 193-201, saponification value of 198 and an iodine value of approximately 95, (source: Henkel Corporation Emery Group).

1015: hydrogenated dimerized oleic acid having an oleic dimer content of 77%, a monomeric content of 11%, and a trimeric content of 12%; an acid value of ~180, saponification value of ~185 acid and an iodine value of <20, (source: Emery).

TPSA: Triple Pressed Stearic Acid monomeric fatty acid, (source: Emery).

AZA: Azelaic acid, (source: Emery)

E933: Monomer resulting from distillation of 1015 dimer above, (source: Emery).

ISA-1: Isostearic acid from oleic acid, (source: Emery).

ISA-2: Isostearic acid from tall oil fatty acid/canola acid, (source: Emery).

ISA-3: from Sigma Chemical

EDA: Ethylenediamine

HMDA: Hexamethylene Diamine

DETA: Diethylene Triamine

S.P.°C.: Softening Point °C. (Ball & Ring)

Visc.,: Viscosity at 160° C. poises (p)

Bloom: Accelerated test for bloom where raised print samples from powdered resin (particle size 150-250 μm) are tested in 140° F. (60° C.) oven for 10 days.

TYPICAL RESIN PREPARATION

The resins described in the Examples summarized in the following Table I were prepared by charging the acid and amine reactants shown in Table I to a reactor along with about 1% of an 85% solution of phosphoric acid as a catalyst. The reaction mixture was heated to 210° to 250° C. and held for 1 to 2.5 hours at that temperature. The resulting resin has the properties as shown in Table II.

After the resins were prepared they were ground to a fine powder suitable for thermographic powders by grinding in a blender and shaking through a 250μ screen and collecting on a 150μ screen. The finely powdered resins were then printed out to provide a raised printing for evaluation in an accelerated bloom test with the results also shown in Table II below.

TABLE I

| | Example | | | | |
|---|---|---|---|---|---|
| | A | B | 1 | 2 | 3 |
| Equivalents of Reactants | | | | | |

TABLE I-continued

| | Example | | | | |
|---|---|---|---|---|---|
| | A | B | 1 | 2 | 3 |
| Acids: | | | | | |
| VD 288 | 36.6 | — | 34.9 | — | — |
| VD 58 | 36.6 | — | 34.9 | — | — |
| 1015 | — | 74.0 | — | 78.0 | 74.0 |
| TPSA | 21.7 | 22.0 | 25.0 | 22.0 | 22.0 |
| AZA | 5.1 | 4.0 | 5.2 | — | 4.0 |
| Amines: | | | | | |
| EDA | 80 | 80 | 75.0 | 97.5 | 75.0 |
| HMDA | 20 | 20 | — | — | — |
| DETA | — | — | 25.0 | 2.5 | 25.0 |

TABLE II

| | Example | | | | |
|---|---|---|---|---|---|
| | A | B | 1 | 2 | 3 |
| S.P., °C. | 120 | 118 | 120 | 121 | 117 |
| Visc. | 3.0 | 2.4 | 3.4 | 2.6 | 3.2 |
| Bloom | YES | YES | YES | SR | O* |

SB = Slight bloom
SR = Substantially Reduced
*Essentially None

As can be seen from the foregoing comparative Examples A and B, which employ dimerized tall oil fatty acid and only diamine in the amine component showed bloom. Example 1, which although employing oleic acid dimer and a mixture of diamine and triamine, required a dicarboxylic acid, azelaic acid, in an amount of 5.2 equivalent percent to provide the desired softening point showed only slight bloom. In contrast thereto, Example 3 which employed 4 equivalent percent of the azelaic acid, a mixture of diamine and polyamine with oleic acid dimer showed essentially no bloom. In Example 2, in which no azelaic acid was employed, the bloom was substantially reduced. The data thus illustrates that the use of polyamine in the amine component along with the diamine, when employed with a saturated monocarboxylic acid such as stearic acid and oleic acid dimer significantly reduced, or substantially eliminated bloom, thus providing a very desirable thermographic powder.

EXAMPLES 3-7

These examples illustrate the preparation of polyamide resins from tall oil fatty acid dimers which form suitable thermographic ink resins having reduced bloom. In the bloom test the samples were kept in a 140° F. oven for 10 days, cooled to room temperature and evaluated for bloom after 24 hours, rating the sample from 1-10, with (Example A above) being the worst and 10 being the best (no bloom). The reactant charge and bloom evaluation can be seen from the following Table III.

TABLE III

| | Example | | | | |
|---|---|---|---|---|---|
| | 4 | 5 | 6 | 7 | 8 |
| | Equivalents of Reactants | | | | |
| Acids: | | | | | |
| VD 288 | 34.4 | 34.4 | 33.4 | 33.4 | 33.4 |
| VD 58 | 34.4 | 34.4 | 33.4 | 33.4 | 33.4 |
| TPSA | 18 | 18 | 18 | 18 | 18 |
| AZA | 5.2 | 5.2 | 5.2 | 5.2 | 5.2 |
| E 933 | 8 | — | — | — | — |
| ISA-1 | — | — | — | 10 | — |
| ISA-2 | — | — | 10 | — | — |
| ISA-3 | — | 8 | — | — | — |
| Oleic Acid | — | — | — | — | 10 |

TABLE III-continued

|  | Example | | | | |
|---|---|---|---|---|---|
|  | 4 | 5 | 6 | 7 | 8 |
| Amines: | | | | | |
| EDA | 75 | 75 | 75 | 75 | 75 |
| DETA | 25 | 25 | 25 | 25 | 25 |
| SP, °C. | 117 | 118 | 114 | 116 | 115 |
| Visc., | 3.8 | 3.8 | 2.9 | 3.2 | 2.5 |
| Bloom | 8 | 8 | 8 | 8 | 7 |

From the foregoing it can be seen that the use of isostearic acid or the monomer from the dimerization of oleic admixed with stearic acid, provides excellent results in comparison with Example A, which has a rating of 1. The isostearic acid and the monomer of oleic acid dimer accordingly provides a basis for improving the bloom properties of resins based on polyunsaturated fatty acid dimers which were employed in the past. Both the isostearic acid (which contains a mixed structure of various isomers) and the monomer which also contains a mixture of low molecular weight oligomers, appears to either limit the diffusion of the bloom material to the surface or prevents "crystallization" of the material into a noticeable form when it gets to the surface.

While the use of acids, such as oleic acid, which has a defined structure, does provide for some reduction in bloom, the level of improvement with the isostearic acid or monomer remains higher.

EXAMPLE 8

In this example, the resin is similar to those in Examples 4-8, but the use of increased amounts of isostearic acid, with a lesser amount of stearic acid, is illustrated. The reactant charge and bloom evaluation can be seen from the following Table IV.

TABLE IV

| Equivalents of Reactants: | |
|---|---|
| Acids: | |
| VD 288 | 33.4 |
| VD 58 | 33.4 |
| TPSA | 10 |
| ISA-2 | 18 |
| AZA | 5.2 |
| Amines: | |
| EDA | 75 |
| DETA | 25 |
| SP | 115 |
| Visc. | 3 |
| Bloom | 9 |

I claim:
1. A polyamide resin reaction product of
(A) an amine component comprised of a mixture of
  (1) 70-98 equivalent percent of an alkylene diamine having from 2 to 4 carbon atoms, and
  (2) 2-30 equivalent percent of an poly alkylene polyamine in which the poly alkylene group contains from 2 to 4 carbon atoms;
(B) an acid component selected from the group consisting of
  (1) a mixture of
    (a) 73-80 equivalent percent of oleic acid dimer,
    (b) 20-27 equivalent percent of a monocarboxylic fatty acid having 16 to 20 carbon atoms,
    (c) <5.5 equivalent percent of a dicarboxylic having from 6 to 10 carbon atoms, and
  (2) a mixture of
    (a) 65-75 equivalent percent of a dimerized $C_{18}$ polyunsaturated fatty acid,
    (b) 8-35 equivalent percent of a monomeric acid selected from the group consisting of monocarboxylic fatty acids having from 16-20 carbon atoms and the monomeric residue from the dimerization of oleic acid, and mixtures thereof,
    (c) <5.5 equivalent percent of a dicarboxylic acid having from 6 to 10 carbon atoms;
wherein the carboxyl equivalents of said acid component is essentially equal to the amine equivalents of said amine component, said polyamide resin having a softening point in the range of about 115° to 125° C.

2. A polyamide resin as defined in claim 1 wherein said monocarboxylic fatty acid (B)(1)(b) is a saturated acid.

3. A polyamide resin as defined in claim 2 wherein said saturated acid is stearic acid.

4. A polyamide resin as defined in claim 1 wherein said alkylene diamine is ethylene diamine.

5. A polyamide resin as defined in claim 1 wherein said polyalkylene polyamine is diethylene triamine.

6. A polyamide resin as defined in claim 1 wherein said monocarboxylic acid (B)(1)(b) is isostearic acid.

7. A polyamide resin as defined in claim 1 wherein said dicarboxylic acid is present in an amount of about 4-5.2%.

8. A polyamide resin as defined in claim 7 wherein said copolymerizing dicarboxylic acid is azelaic acid.

9. A polyamide resin as defined in claim 1 wherein said oleic acid dimer comprises from 74 to 78 carboxyl equivalent percent of said acid component.

10. A polyamide resin as defined in claim 9 wherein said monocarboxylic acid (B)(1)(b) is selected from the group consisting of stearic acid or isostearic acid in an amount of about 22-26 equivalent percent, said dicarboxylic acid is azelaic acid in an amount of about 4-5.2 equivalent percent and said polyamide resin has amine and acid numbers less than about 10.

11. A polyamide resin as defined in claim 10 wherein said resin is obtained by reaction at a temperature of about 180° to about 300° C. for a time sufficient to effect amidification providing a condensation polymer of said acid and amine components.

12. A polyamide resin as defined in claim 1 wherein said dimerized $C_{18}$ polyunsaturated fatty acid B)(2)(a) is dimerized tall oil fatty acid.

13. A polyamide resin as defined in claim 12 wherein said monomeric, monocarboxylic acid (b)(2) b) is stearic or isostearic acid.

14. A polyamide resin as defined in claim 13, wherein said (B)(2)(b) acid is a mixture of stearic acid and isostearic acid.

15. A polyamide resin as defined in claim 12 wherein (B)(2)(b) is a mixture of stearic acid and oleic acid.

16. A polyamide resin as defined in claim 12 wherein (B)(2)(b) is a mixture of stearic acid and the monomeric residue of the dimerization of oleic acid.

17. A polyamide resin as defined in claim 12 wherein said dimerized tall oil fatty acid is employed in an amount of from 68-72 equivalent percent, said dicarboxylic acid is azelaic acid in an amount of about 4-5.2 equivalent percent and said monomeric acid (B)(2)(b) is selected from the group consisting of (i) a mixture of stearic acid and isostearic acid, (ii) a mixture of stearic acid and the monomeric residue of the dimerization of oleic acid and is employed in an amount of about 26-28 equivalent percent.

18. A thermographic powder containing the polyamide resin defined in claim 1.

19. A thermographic powder containing the polyamide resin defined in claim 10.

20. A thermographic powder containing the polyamide resin defined in claim 17.

* * * * *